US008463945B2

(12) United States Patent
Steiner et al.

(10) Patent No.: US 8,463,945 B2
(45) Date of Patent: Jun. 11, 2013

(54) METHOD FOR SYNCHRONIZING LOCAL CLOCKS IN A DISTRIBUTED COMPUTER NETWORK

(75) Inventors: Wilfried Steiner, Vienna (AT); Gunther Bauer, Vienna (AT); Matthias Wachter, Vienna (AT); Michael Paulitsch, Columbia-Heights, MN (US); Brendan Hall, Eden Prairie, MN (US)

(73) Assignees: TTTech Computertechnik Aktiengesellschaft, Vienna (AT); Honeywell International Inc., Morristown, NJ (US)

( * ) Notice: Subject to any disclaimer, the term of this patent is extended or adjusted under 35 U.S.C. 154(b) by 164 days.

(21) Appl. No.: 12/995,588

(22) PCT Filed: Jun. 2, 2008

(86) PCT No.: PCT/AT2008/000191
§ 371 (c)(1),
(2), (4) Date: Feb. 14, 2011

(87) PCT Pub. No.: WO2009/146471
PCT Pub. Date: Dec. 10, 2009

(65) Prior Publication Data
US 2011/0173347 A1 Jul. 14, 2011

(51) Int. Cl.
G06F 15/16 (2006.01)
(52) U.S. Cl.
USPC .......................................... 709/248
(58) Field of Classification Search
None
See application file for complete search history.

(56) References Cited

U.S. PATENT DOCUMENTS

2005/0128950 A1* 6/2005 Hall et al. ..................... 370/235
2011/0138080 A1 6/2011 Steiner et al.

FOREIGN PATENT DOCUMENTS

WO   WO 2007/000007 A1   1/2007
WO   WO 2007000007 A1 *  1/2007

OTHER PUBLICATIONS

Steiner, W., Startup and Recovery of Fault-Tolerant Time-Triggered Communication, Dec. 2004, pp. 42-59 and 81-83.
Steiner, Wilfried and Paulitsch, Michael, "The Transition from Asynchronous to Synchronous System Operation: An Approach for Distributed Fault-Tolerant Systems", 2002, IEEE.
Steiner, Wilfried and Kopetz, Hermann, "The Startup Problem in Fault-Tolerant Time-Triggered Communication", 2006, IEEE.
Paulitsch, Michael and Steiner, Wilfried, "Fault-Tolerant Clock Synchronization for Embedded Distributed Multi-Cluster Systems", 2003, IEEE.

(Continued)

Primary Examiner — Andrew L Nalven
Assistant Examiner — Mohammed Waliullah
(74) Attorney, Agent, or Firm — Joseph E. Maenner; Maenner & Associates, LLC

(57) ABSTRACT

A method for synchronizing local clocks in a distributed computer network, wherein end systems and switches of the network executes the method as a synchronization state machine, which uses three different frame types. The states in the state machine belong to an unsynchronized or to a synchronized set of states. All end systems being configured as Synchronization Master periodically send coldstart frames in one of the unsynchronized states, all end systems being configured as Synchronization Master react to the reception of a coldstart frame by sending a coldstart acknowledgment frame a first timeout after the reception of the coldstart frame on all replicated communication channels. First timeout is reset when a consecutive coldstart frame is received before the coldstart acknowledge is sent, and all Synchronization Masters react to the reception of a coldstart acknowledgment frame by starting a second timeout and enter a synchronized state when the second timeout expires.

17 Claims, 9 Drawing Sheets

OTHER PUBLICATIONS

Steiner, Wilfried and Rushby, John, "Model Checking a Fault-Tolerant Startup Algorithm: From Design Exploration to Exhaustive Fault Simulation", 2004, IEEE.

PCT/AT2008/000191 Written Opinion, Dec. 2, 1010.

PCT/AT2008/000191International Preliminary Report on Patentability, Dec. 6, 1010.

Kopetz, H. and Ochsenreiter, W., "Clock Synchronization in Distributed Real-Time Systems", IEEE Transactions on Computers, vol. C-36, No, 8, Aug. 1987.

Schneider, Fred B., "A Paradigm for Reliable Clock Synchronization", Cornell University, Apr. 1986.

Srikanth, T.K. and Toueg, Sam, "Optimal Clock Snychronization", Journal of the ACM, vol. 34, No. 3, Jul. 1987, pp. 626-645.

Lamport, Leslie and Melliar-Smith, P.M., "Byzantine Clock Synchronization", ACM SIGOPS Operating Systems Review, vol. 20, No. 3, pp. 10-16, 1986.

* cited by examiner

ME THOD FOR SYNCHRONIZING LOCAL
CLOCKS IN A DISTRIBUTED COMPUTER
NETWORK

CROSS REFERENCE TO RELATED
APPLICATIONS

The present application is a U.S. National Stage Application of PCT Application Serial No. PCT/AT2008/000191, filed on Jun. 2, 2008 which is incorporated by reference in its entirety.

BACKGROUND

The invention relates to synchronizing local clocks in a distributed computer network. Of particular interest are computer networks that exchange information via messages that are sent on communication links between components in the network. Without restriction to a specific realization of the invention we use standard Ethernet as an illustrating example. In standard Ethernet end systems are connected via network switches via bi-directional communication links. An end system will communicate with a second end system or a group of end systems via sending a message to the switch, which will then relay the message to the receiving end system or end systems. Likewise end systems can be connected directly to each other via bi-directional communication links, which makes a clear differentiation between end systems and switches in certain configurations difficult. Hence, generally we use the term component to refer to a physical device that can be either end system or switch. Whether a component is said to be an end system or said to be a switch is determined by its usage rather than its physical appearance.

The clock synchronization problem is the problem of bringing the local clocks of different components into close agreement. For fault-tolerance reasons a magnitude of components can be configured that generate synchronization messages.

The problem of synchronizing local clocks has a long history and many algorithms that claim synchronization of local clocks also in presence of failures are known (*Byzantine clock synchronization*, Lamport, L. and Melliar-Smith, P. M., ACM SIGOPS Operating Systems Review, volume 20, number 3, p. 10-16, 1986, ACM New York, N.Y., USA; *Optimal clock synchronization*, Srikanth, T K and Toueg, S., Journal of the ACM (JACM), volume 34, number 3, p. 626-645, 1987, ACM New York, N.Y., USA; *A paradigm for reliable clock synchronization*, Schneider, F. B., Department of Computer Science Technical Report TR, p. 86-735; *Clock synchronization in distributed real-time systems*, Kopetz, H. and Ochsenreiter, W., IEEE Transactions on Computers, volume 36, number 8, p. 933-940, 1987, IEEE Computer Society Washington, D.C., USA; *Startup and Recovery of Fault-Tolerant Time-Triggered Communication: With a Focus on Bus-Based and Switch-Based Network Topologies*, Steiner, W., 2008, Vdm Verlag Dr. Müller).

BRIEF SUMMARY OF THE INVENTION

The invention differentiates from the above mentioned protocols in its fault-tolerance properties.
  The invention is scalable: the invention can be configured to operate as simple Master-Slave clock synchronization protocol for example to be used in industrial control. On the other side of the spectrum the invention can be configured to operate as Multi-Master clock synchronization protocol for example to be used in manned space applications. This scalability gives a vast economic benefit: as the invention can be used throughout different application domains, the cost of the realization of the invention can be decreased significantly. Likewise, the cross-domain usage of the invention increases the probability of latent failure detection in the realization of the invention and by this maturing the realization of the invention significantly. This is also called "proof-by-million" following the concept, that the probability of correctness is a direct function of the number of its implementations.
  The invention tolerates multiple inconsistent faults: When configured to Multi-Master mode, the invention tolerates a fully inconsistent-omission faulty communication path and even a faulty end system at the same point in time. This failure mode means that each faulty component can arbitrarily drop messages on any of its incoming communication link and on any of its outgoing communication links with potential inconsistent dropping behavior for each message. Although, the inventors have vast experience with fault-tolerant clock synchronization, the inventors are not aware of any pre-existing fault-tolerant synchronization algorithm that would tolerate this level of fault-tolerance. The invention therefore allows a more cost-efficient realization of system architectures that require tolerance of multiple failures in the system. For example said inconsistent failure mode can even be tolerated in a system architecture that consists of only two independent communication channels. Previous realizations of communication architectures that tolerate said failure required at least three independent communication channels.
  The invention tolerates arbitrary transient disturbances even in presence of permanent failures. In addition to the said fault-tolerance, the invention also provides self-stabilization properties. Self-stabilization means that the synchronization will be re-established also after transient upsets in a multitude of components in the distributed computer system. The invention stabilizes from an arbitrary system state to a synchronized system state by using formal methods (model-checking studies). This self-stabilizing property becomes more and more important with decreasing feature sizes in computer chips and therefore resulting increase in transient upsets in components. The design of future reliable distributed computer networks depends on an effective and sound tolerance of multiple transient upsets as provided with this invention. Although, the inventors have vast experience with fault-tolerant clock synchronization, the inventors are not aware of any pre-existing fault-tolerant synchronization algorithm that would tolerate this level of fault-tolerance.
  The invention is based on following innovative steps:
  new concept of a fault-tolerant handshake process, to establish synchronization upon power-on of the system as well as to re-gain synchronization once overall synchronization is lost. In contrast to previous protocols the fault-tolerant handshake ensures end-to-end consistency also in presence of inconsistent communication channels and even a faulty end system at the same point in time, provided that there exists at least one non-faulty communication channel. The fault-tolerant handshake guarantees that either the coldstart message or the resulting coldstart acknowledgment message (or both messages) are seen consistently in the system.
  new concept of different types of clique detection mechanisms, that act both, on the number of end systems synchronized with a given component, as well as on the number of end systems that are identified to be not synchronized with said component, as well as on a relation between the two new concept of multiple synchronized states, that allow to specify different clique detection mechanisms for different synchronization states; as a time-triggered protocol can tolerate a much broader failure model once synchronization is established than during the startup process. The different synchronization states can be used to track the history of operation of the synchronization process. In early and easily reached synchronized states, the clique detection mechanisms are configured very fragile to capture all possible clique scenarios, while in later synchronization states (which are entered, if a sufficient number of end systems are seen by a component, or if synchronous communication was successful for a configurable number of synchronization rounds), the clique detection mechanisms are configured more relaxed, such that a broader failure model can be tolerated without executing a synchronization reset.

new concept of central guardian functionality, that can be enabled in the switches if the end systems that provide the synchronization messages are not trusted. Likewise the central guardian functionality can be reduced to a minimum functionality if the end systems that provide the synchronization are trusted.

re-use of the concept of implementation of a subset of devices according a high-integrity design; components that are implemented according to a high-integrity design principle can be assumed to fail in a restricted failure mode. It is engineering practice that components that are implemented according a high-integrity principle are trusted, however, restricted failure mode does not mean fail-silent. The invention allows a fully inconsistent omission failure mode also for high-integrity components. This failure mode means that each faulty component can arbitrarily drop messages on any of its incoming communication link and on any of its outgoing communication links with potential inconsistent dropping behavior for each message.

SHORT DESCRIPTION OF FIGURES

DETAILED DESCRIPTION OF THE PRESENT INVENTION

Figure 1:
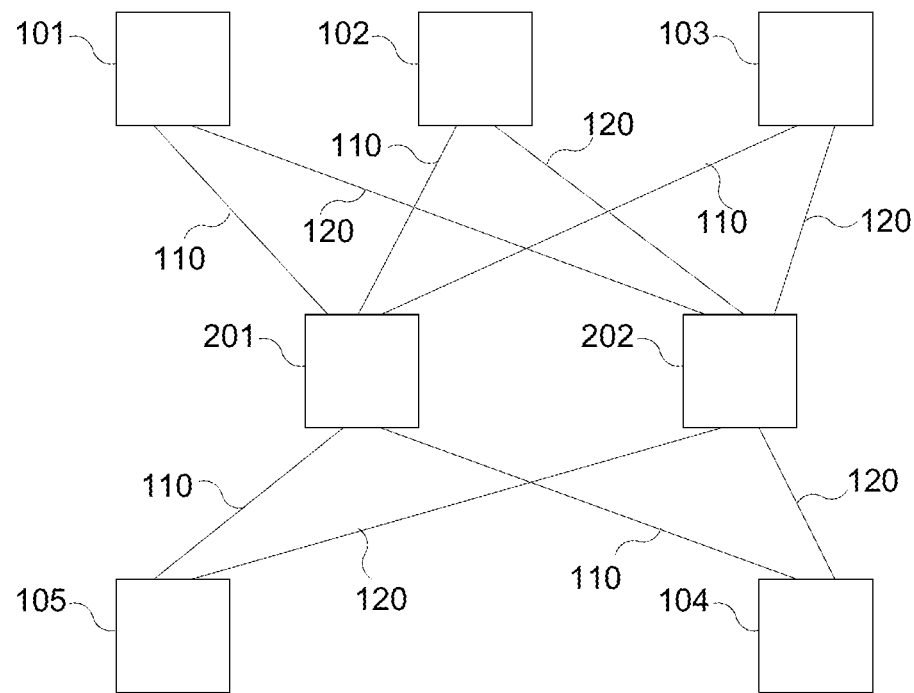
FIG. 1 depicts an example of a distributed computer network.

FIG. 1 depicts a distributed computer network consisting of 5 end systems 101-105 and 2 switches 201, 202. Each of the end systems 101-105 is connected via a bi-directional communication link 110 to switch 201 and with another bi-directional communication link 120 to switch 202. Hence, the distributed computer network provides two redundant communication channels for communication between any two end systems 101-105.

The end systems 101-105 generate synchronization messages that are consumed by the switches 201, 202. The switches 201, 202, generate new synchronization messages from the synchronization messages received from the end systems 101-105.

Once the end systems 101-105 are synchronized, the end systems 101-105 will dispatch the synchronization messages at the same a priori scheduled instant. Dispatch refers to an internal signal in an end system 101-105, which indicates that a message is ready for transmission. The actual start of transmission of a message on the communication links 110, 120 can be delayed. One reason for this delay is that there is another message already in transmission progress. The newly dispatched message will then be delayed until the transmission of the message in progress is finished on the communication links 110, 120.

In addition to these end systems 101-105 there can be end systems in the distributed computer network that are only consumers of the synchronization messages and do not dispatch synchronization messages. End systems that do dispatch synchronization messages 101-105 are called Synchronization Masters.

Figure 2:
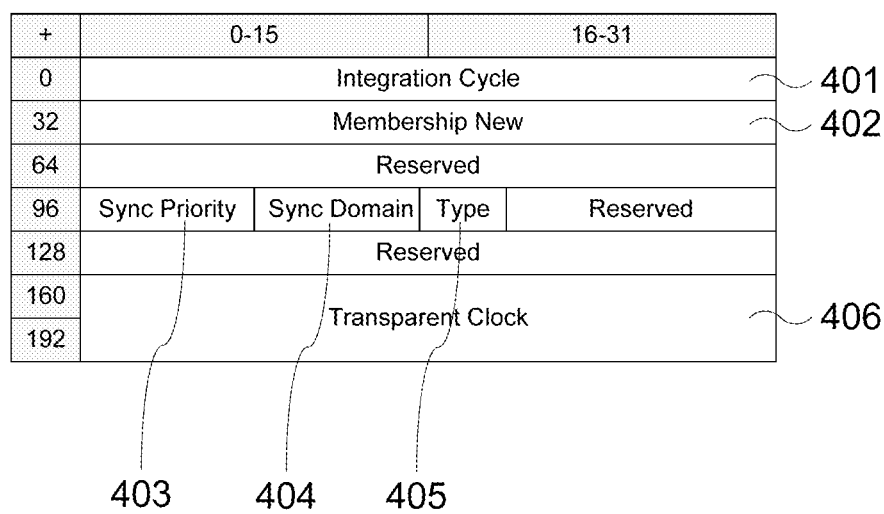
FIG. 2 depicts an example of the data structure for synchronization messages.

FIG. 2 depicts an example of the data structure for synchronization messages. In one realization the field Integration Cycle 401 is used to indicate a position in a time-triggered communication schedule. In one realization the Membership New field 402 is used to indicate the sender of the respective message. In one realization the Sync Priority field 403 is used to realize a priority mechanism on synchronization messages. In one realization the Sync Domain field 404 is used to realize independent sets of components that are synchronized to each other: synchronization messages for components in different independent sets will have different values assigned to the Sync Domain field 404. In one realization the Type field 405 is used to realize different synchronization message types: usually synchronization protocol use different types to differentiate synchronization messages that are used upon power-up from synchronization messages that are executed once synchronization beyond components is established. In one realization the Transparent Clock field 406 is used to track the dynamic delay imposed by end systems and switches while the message traverses through a distributed computer network. In one realization, each component that causes a delay on the message will add this delay to the value in the Transparent Clock field 406.

Figure 3:
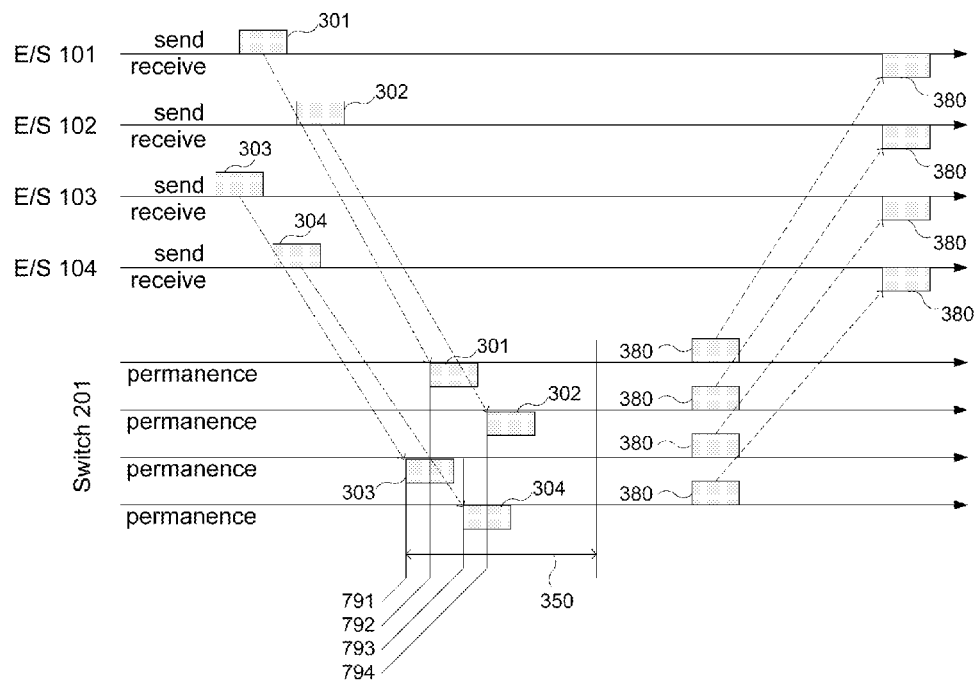
FIG. 3 depicts the flow of synchronization message from end systems to a switch and a synchronization compression function executed in the switch.

FIG. 3 depicts the message flow of synchronization messages 301-304, 380 in the distributed computer network, progress in real-time is depicted from left to right. End systems 101-104 generate synchronization messages 301-304 and send these messages to the switch 201. Switch 201 records the arrival points in time of the synchronization messages 301-304 and calculates the permanence points in time

791-794 of these messages. From the permanence points in time 791-794, the switch 201 calculates the dispatch point in time of a compressed synchronization message 380 which is then sent to the end systems 101-104. Likewise, the switch 201 can forward each synchronization message 301-304 instead of a compressed synchronization message 380. When the switches compress synchronization messages it sets those bits in the Membership new field 402 of the compressed synchronization message that are associated with end systems that provided a synchronization message which was used to calculated the dispatch point in time of the compressed synchronization message.

The term "permanence" is associated with a single message and refers to a point in time from which on this message can be used by a receiver with a guarantee that the receiver will not receive another message after this point in time that has been sent prior to said first message.

Depending on the protocol state of the switch, the switch may block certain synchronization messages. We call this blocking of synchronization messages a central guardian function.

In addition to producing or relaying synchronization messages, the switch uses the synchronization messages itself for synchronization. In the further description of a realization we will discuss the protocol state machine executed in the switch (FIG. 8-FIG. 9), which takes as input also the compressed synchronization messages.

The message flow on only one communication channel, channel including switch 201, is depicted. In one realization the end systems 101-104 send synchronization messages 301-304 concurrently or in sequence on the replicated communication channels.

Figure 4:
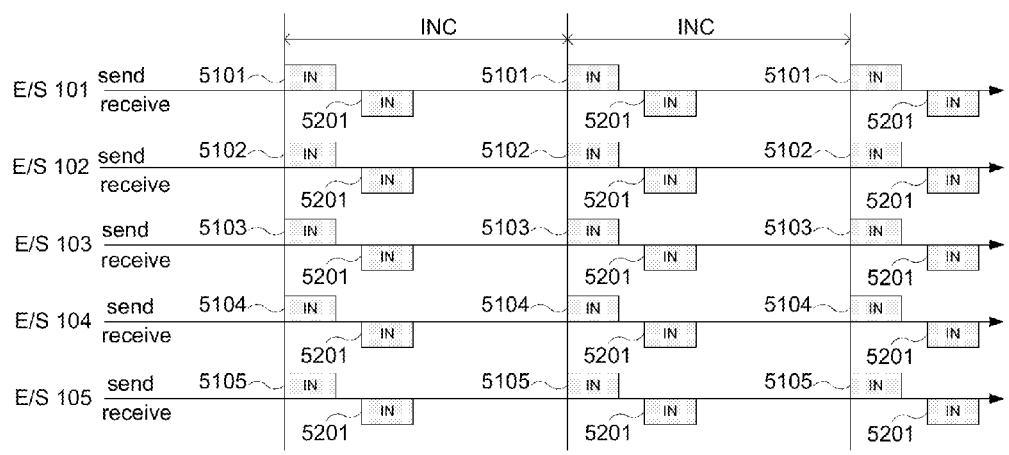
FIG. 4 depicts three iterations of the synchronization process in synchronized operation.

FIG. 4 depicts three iterations of the synchronization process during synchronized operation, that is, once the local clocks of a sufficient subset of the end systems 101-105 and switches 201-202 have been successfully synchronized. Progress in real-time is depicted from left to right. At pre-scheduled points in time, the end systems dispatch synchronization messages 5101-5105. The switches 201-202 use the synchronization messages to synchronize their local clocks and to generate a compressed synchronization message 5201 each. The synchronization messages from the switches 201-202 are then used to synchronize the local clocks of the end systems 101-105.

The synchronization messages 5101-5105 from the end systems 101-105 are used for clock synchronization in the switches 201-202 as well as for integration or re-integration of switches 201-202. The synchronization messages 5201 from the switches 201-202 are used for clock synchronization as well as for integration or re-integration of end systems 101-105.

During synchronized operation, the synchronization messages are scheduled with a period of INC timeunits. The end system uses a variable LocalIntegrationCycle to cyclically count the integration cycle starting with 0 up to a specified maximum. The end system uses the LocalIntegrationCycle value to set the Integration Cycle field 401 in the integration frames it transmits and to check against the Integration Cycle field 401 it receives.

The message flow on only one communication channel, channel including switch 201, is depicted. In one realization the end systems 101-105 send synchronization messages 5101-5105 concurrently or in sequence on the replicated communication channels.

Figure 5:
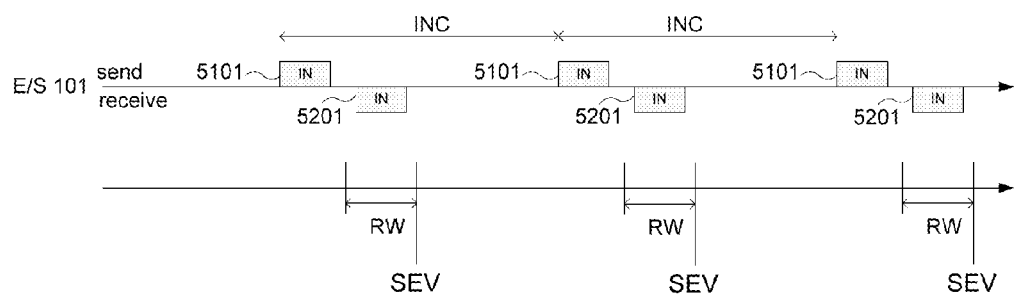
FIG. 5 depicts the synchronous clique detection process.

FIG. 5 depicts the synchronous clique detection process. The synchronous clique detection process uses a local variable to keep track on how many end systems are currently synchronized with the respective end system. An end system will update varLocalMembershipComp when a receive window RW around the scheduled reception point in time of a given integration frame expires. It will set then varLocalMembershipComp to the maximum Membership new field 402 of an integration frame received during the receive window RW, given that the Integration Cycle field 401 in the received integration frame matches the value of the LocalIntegrationCycle.

Figure 7:
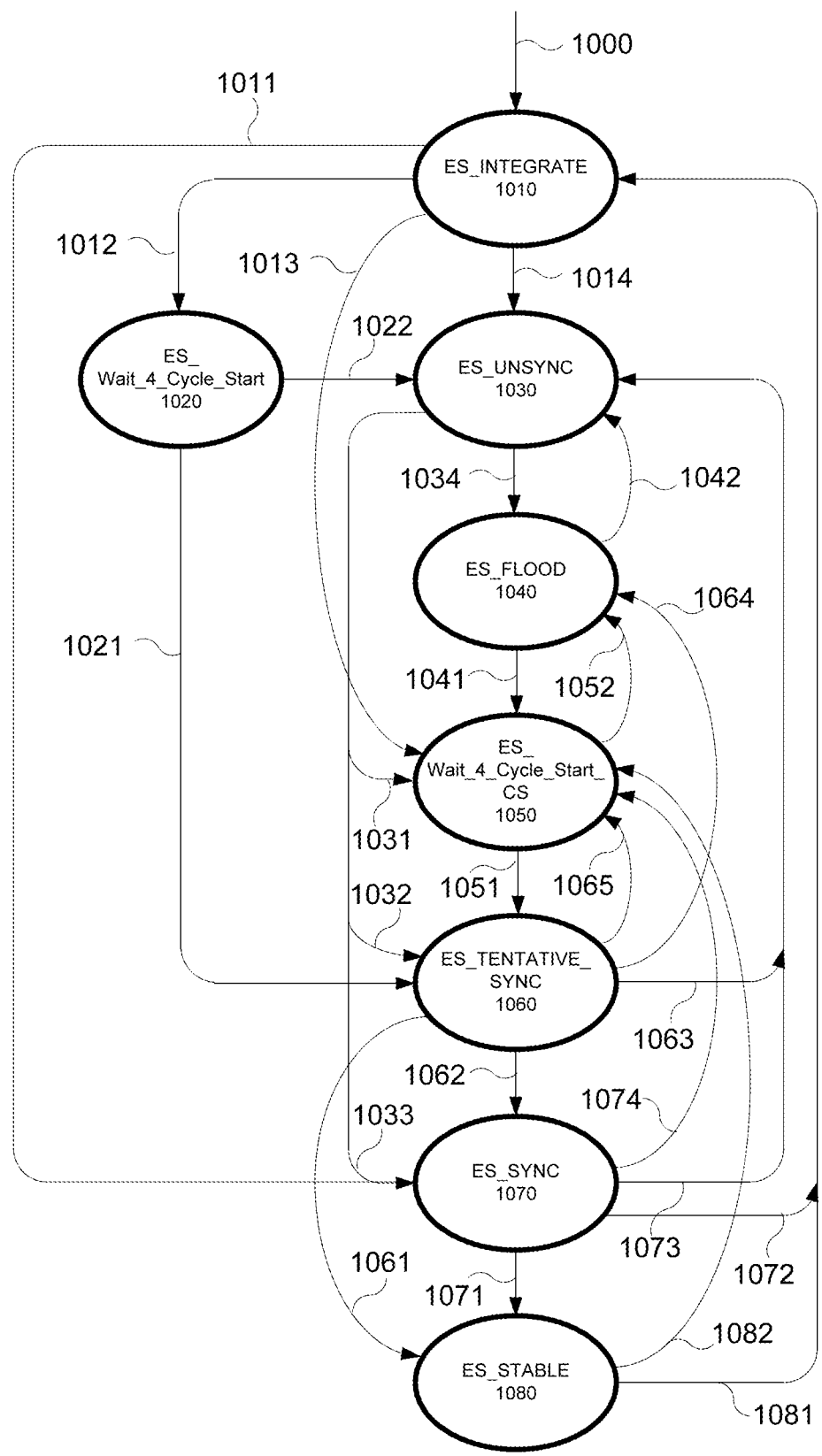
FIG. 7 depicts the protocol state machine executed in an end system.

The synchronous clique detection mechanism can be enabled or disabled independently for each synchronized state (ES_TENTATIVE_SYNC state 1060, ES_SYNC state 1070, ES_STABLE state 1080, see FIG. 7). If the synchronous clique detection mechanism is enabled in a synchronized state, varLocalMembershipComp is tested against a state-specific threshold (TentativeSyncThresholdSync, SyncThresholdSync, or StableThresholdSync) after varLocalMembershipComp is updated at the synchronous evaluation point in time SEV. The test is successful if the number of bits set in varLocalMembershipComp is lower than the respective threshold and not successful otherwise.

Figure 8:
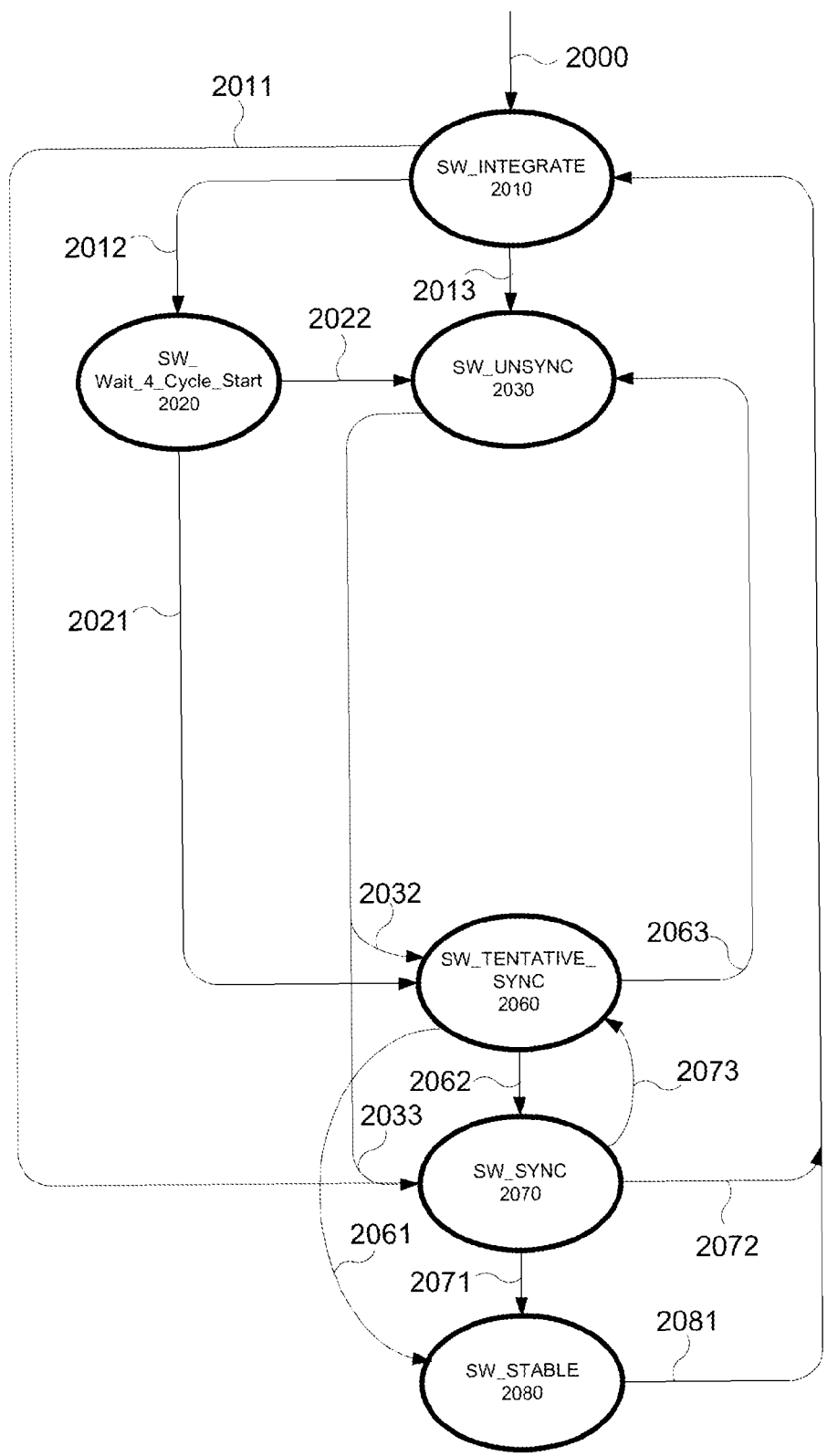
FIG. 8 depicts the protocol state machine executed in a switch if the end systems are assumed to be trusted.

Analogously to the end system also the switches will also execute the synchronous clique detection algorithm in the synchronized states (SW_TENTATIVE_SYNC state 2060, SW_SYNC state 2070, and SW_STABLE state 2080, see FIG. 8) when enabled.

Figure 6:
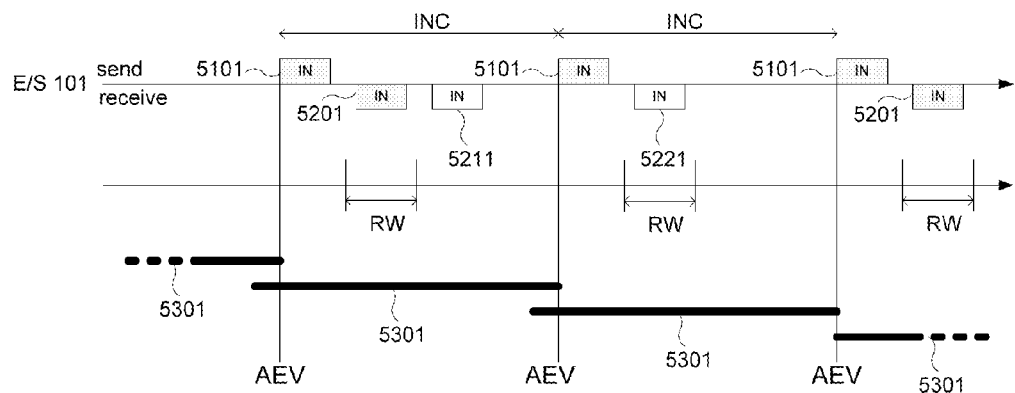
FIG. 6 depicts the asynchronous clique detection process.

FIG. 6 depicts the asynchronous clique detection process. The asynchronous clique detection process uses a local variable varLocalAsyncMembCount to keep track on how many end systems are currently not synchronized with the respective component, but operational (thus, excluding end systems that are powered-off). The variable varLocalAsyncMembCount is a bit-vector with a one-to-one relation from bit to end system.

The asynchronous clique detection mechanism can be enabled or disabled independently for each synchronized state (ES_TENTATIVE_SYNC state 1060, ES_SYNC state 1070, ES_STABLE state 1080). If the asynchronous clique detection mechanism is enabled in a synchronized state, varLocalAsyncMembCount is tested against a state-specific threshold (TentativeSyncThresholdAsync, SyncThresholdAsync, or StableThresholdAsync) at the asynchronous evaluation point in time AEV.

An end system will update varLocalAsyncMembCount when it receives an integration frame outside the respective receive window RW; this is also called an out-of-schedule reception. As indicated in FIG. 6 an out-of-schedule reception can either be a reception of an integration frame outside any receive window RW (depicted by integration frame 5211) or it can be a reception of an integration frame within a receive window, but where the received integration frame carries the wrong Integration Cycle Field 401 (depicted by integration frame 5221).

When an end system receives an out-of-schedule integration frame all bits set in the Membership New field 402 of the integration frame will also be set in varLocalAsyncMembCount. At the asynchronous evaluation point in time AEV the varLocalAsyncMembCount is evaluated. The test is successful if the number of bits set in varLocalMembershipComp is equal to or higher than the respective state-specific threshold. The test is also successful, when varLocalMembershipComp is less than 2 (meaning that the switch is currently only synchronized to a single end system or no end system at all) and the varLocalAsyncMembCount is at least 1. In all other cases the asynchronous clique detection process is not successful.

Analogously to the end system the switches will also execute the asynchronous clique detection algorithm in the synchronized states (SW_TENTATIVE_SYNC state 2060, SW_SYNC state 2070, and SW_STABLE state 2080) when enabled. The asynchronous evaluation point in time AEV, however, will be immediately before the synchronous evaluation point in time SEV.

FIG. 7 depicts the protocol state machine executed in an end system. The end system differentiates unsynchronized states and synchronized states. To the unsynchronized states belong ES_INTEGRATE state 1010, ES_WAIT_4_CYCLE_START state 1020, ES_UNSYNC state 1030, ES_FLOOD state 1040, and ES_WAIT_4_CYCLE_START_CS state 1050. To the synchronized states belong ES_TENTATIVE_SYNC state 1060, ES_SYNC state 1070, ES_STABLE state 1080. End systems can enter a synchronized state from an unsynchronized state via the reception of integration frames, in this case we call the transition from unsynchronized to synchronized an integration process. Also, end systems can enter a synchronized state from an unsynchronized state via the successful execution of the Fault-Tolerant Handshake. In this second case we speak of a coldstart or reset process. In the following we discuss the state machine depicted in FIG. 7 assuming that all end systems are clock synchronization masters. In another realization only a subset of end systems may be configured to be clock synchronization masters. End systems that are not configured to be clock synchronization master enter a synchronized state only via the integration process, thus execute only a subset of transitions in the state machine.

ES_INTEGRATE State 1010 and ES_WAIT_4_CYCLE_START State 1020

Upon power-on the end system starts in ES_INTEGRATE state 1010. From ES_INTEGRATE state 1010 the end system can enter a synchronized state ES_SYNC state 1070 when it receives an integration frame with a sufficiently high number of bits set in the Membership new field 402 (Transition 1011). Also, the end system can enter ES_TENTATIVE_SYNC state 1060 vie the ES_WAIT_4_CYCLE_START state 1020 if it receives an integration frame with a sufficiently high number of bits set in an integration frame (Transitions 1012, 1021), but insufficiently high number of bits set to transit to ES_SYNC state 1070 (Transition 1011). When the end system in ES_INTEGRATE state 1010 receives a coldstart acknowledge frame it transits to WAIT_4_CYCLE_START_CS state 1050 (Transition 1013).

When the end system does not receive integration frames with a sufficient number of bits set for either transition 1011 or 1012 for a configurable duration, the end system enters ES_UNSYNC state 1030 (Transition 1014).

ES_UNSYNC State 1030

While the end system is in ES_UNSYNC state 1030 it transmits coldstart frames on all replicated channels with a configured period.

From ES_UNSYNC state, the end system, again, is allowed to enter either ES_TENTATIVE_SYNC state 1060 or ES_SYNC state 1070 provided that it receives an integration frame with a sufficient number of bits set for the transition 1032 or transition 1033 (integration process). When the end system is in ES_UNSYNC state and receives a coldstart acknowledge frame it transits to ES_WAIT_4_CYCLE_START_CS state (Transition 1031).

In addition in the ES_UNSYNC state 1030 the end system is also able to start a Fault-Tolerant Handshake process. When the end system in ES_UNSYNC state receives a coldstart frame it enters ES_FLOOD state 1040 (Transition 1034) and the Fault-Tolerant Handshake is said to be started.

ES_FLOOD State 1040

In the ES_FLOOD state 1040 the end system waits for a duration of CSO and transmits a coldstart acknowledge frame on all replicated communication channels, when the CSO times out. When the end system receives a coldstart frame before the CSO timeout expires than the CSO timeout is restarted. All integration frames are discarded in the ES_FLOOD state 1040. When the CSO timeout expires and the end system sends a coldstart acknowledge frame, then it waits to receive a coldstart acknowledge frame. If it receives a coldstart acknowledge frame within an expected arrival window, then it concludes that the Fault-Tolerant Handshake was successful and enters the ES_WAIT_4_CYCLE_START_CS state 1050 (Transition 1041). Coldstart acknowledge frames that are received too early are discarded. When the end systems sends a coldstart acknowledge frame, but does not receive a coldstart acknowledge frame back in the expected arrival window, it concludes that the Fault-Tolerant Handshake was not successful and transits back to ES_UNSYNC state 1030 (Transition 1042).

The Fault-Tolerant Handshake allows to tolerate startup/restart collisions of coldstart frames, as well as, to startup in presence of faulty components. Scenarios for both cases are depicted in the FIG. 10-FIG. 12.

ES_WAIT_4_CYCLE_START_CS State 1050

Figure 10:
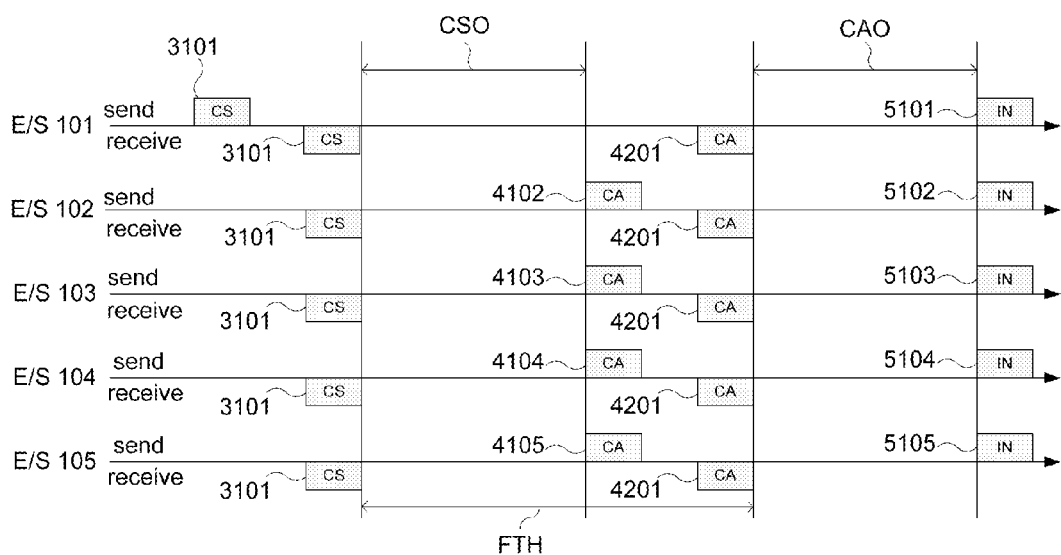
FIG. 10 depicts a fault-free and collision-free startup scenario of the distributed computer network.
Figure 11:
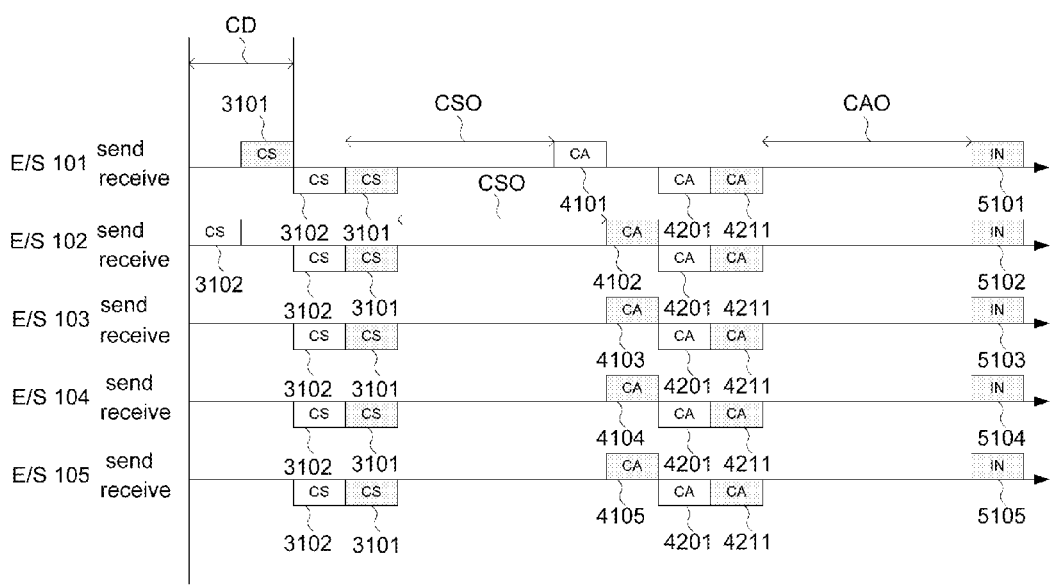
FIG. 11 depicts a fault-free startup collision scenario of the distributed computer network.

In the ES_WAIT_4_CYCLE_START_CS state 1050 the end system waits for a coldstart acknowledge timeout CAO (see FIG. 10, FIG. 11). When the end system receives a coldstart acknowledge frame before CAO times out, then the CAO timeout is restated. When the end system receives a coldstart frame, then the end system transits to ES_FLOOD state 1050 and starts the Fault-Tolerant Handshake (Transition 1052). When the CAO timeout expires, the end system transits to ES_TENTATIVE_SYNC state 1060 (Transition 1051).

ES_TENTATIVE_SYNC State 1060

When either one of the clique detection algorithms is enabled and returns successful than the end system transits to ES_UNSYNC state 1030 (Transition 1063). When the end system receives a coldstart frame it transits to ES_FLOOD state 1040 (Transition 1064) and starts the Fault-Tolerant Handshake. When the end system receives a coldstart acknowledge frame it transits to ES_WAIT_4_CYCLE_START_CS state 1050 (Transition 1065). When the number of bits set in the varLocalMembershipComp variable that is used in the synchronous clique detection algorithm grows beyond a configurable threshold, then the end system transits to ES_SYNC state 1070 (Transition 1062). When the end system stays in the ES_TENTATIVE_SYNC state 1060 for a configurable number of integration cycles INC, the end system may transit to ES_STABLE state 1080, if a configurable flag is set.

ES_SYNC State 1070

When either one of the clique detection algorithms is enabled and returns successful than the end system can be configured to either transit to ES_UNSYNC state 1030 (Transition 1073) or to ES_INTEGRATE state 1010 (Transition 1072). When the end system receives a coldstart acknowledge frame, it transits to ES_WAIT_4_CYCLE_START_CS state 1050 (Transition 1074). When the end system stays in the ES_SYNC state 1070 for a configurable number of integration cycles INC, the end system may transit to ES_STABLE state 1080, if a configurable flag is set.

ES_STABLE State 1080

When the asynchronous clique detection algorithm is enabled and returns successful, the end system transits to ES_INTEGRATE state 1010 (Transition 1081). Also, when the synchronous clique detection algorithm is enabled and returns successful for a configurable number or sequential integration cycles INC, then the end system transits to ES_INTEGRATE state 1010 (Transition 1081) as well. When the end system receives a coldstart acknowledge frame it transits to the ES_WAIT_4_CYCLE_START_CS state.

FIG. 8 depicts the protocol state machine executed in a switch, if the end systems are assumed to be trusted. The switch state machine in this case is very similar to the end system state machine. In one realization the state machines of end system and switch are unified, such that the behavior of end system and switch can be selected via configuration.

SW_INTEGRATE_State 2010 and SW_WAIT_4_CYCLE_START State 2020

Upon power-on the switch state machine starts in SW_INTEGRATE state 2010. From SW_INTEGRATE state 2010 the switch can enter a synchronized state SW_SYNC state 2070 when it receives an integration frame with a sufficiently high number of bits set in the Membership new field 402 (Transition 2011). Also, the switch can enter SW_TENTATIVE_SYNC state 2060 via the SW_WAIT_4_CYCLE_START state 2020 if it receives an integration frame with a sufficiently high number of bits set in an integration frame (Transitions 2012, 2021), but insufficiently high number of bits set to transit to SW_SYNC state 2070 (Transition 2011).

When the switch does not receive integration frames with a sufficient number of bits set for either transition 2011 or 2012 for a configurable duration, the switch enters SW_UNSYNC state 2030 (Transition 2013).

SW_UNSYNC State 2030

From SW_UNSYNC state, the switch is allowed to enter either SW_TENTATIVE_SYNC state 2060 or SW_SYNC state 2070 provided that it receives an integration frame with a sufficient number of bits set for the transition 2032 or transition 2033 (integration process).

SW_TENTATIVE_SYNC State 2060

When either one of the clique detection algorithms is enabled and returns successful than the switch transits to SW_UNSYNC state 2030 (Transition 2063).

When the number of bits set in the varLocalMembership-Comp variable that is used in the synchronous clique detection algorithm grows beyond a configurable threshold, then the switch transits to SW_SYNC state 2070 (Transition 2062). When the switch stays in the SW_TENTATIVE_SYNC state 2060 for a configurable number of integration cycles INC, the switch may transit to SW_STABLE state 2080, if a configurable flag is set (Transition 2061).

SW_SYNC State 2070

When the asynchronous clique detection algorithm is enabled and returns successful, the switch transits to SW_INTEGRATE state 2010 (Transition 2072). When the synchronous clique detection algorithm is enabled and returns successful, the switch transits either to SW_INTEGRATE state 2010 (Transition 2072) or to SW_TENTATIVE_SYNC state 2060 (Transition 2073), depending on the switch's configuration.

When the switch stays in the SW_SYNC state 2070 for a configurable number of integration cycles INC, the switch may transit to SW_STABLE state 2080, if a configurable flag is set (Transition 2071).

In SW_SYNC state 2070 the switch will not forward coldstart frames.

SW_STABLE State 2080

When the asynchronous clique detection algorithm is enabled and returns successful, the switch transits to SW_INTEGRATE state 2010 (Transition 2081). Also, when the synchronous clique detection algorithm is enabled and returns successful for a configurable number or sequential integration cycles INC, then the switch transits to SW_INTEGRATE state 2010 (Transition 2081) as well.

In SW_STABLE state 2080 the switch will not forward coldstart frames.

Figure 9:
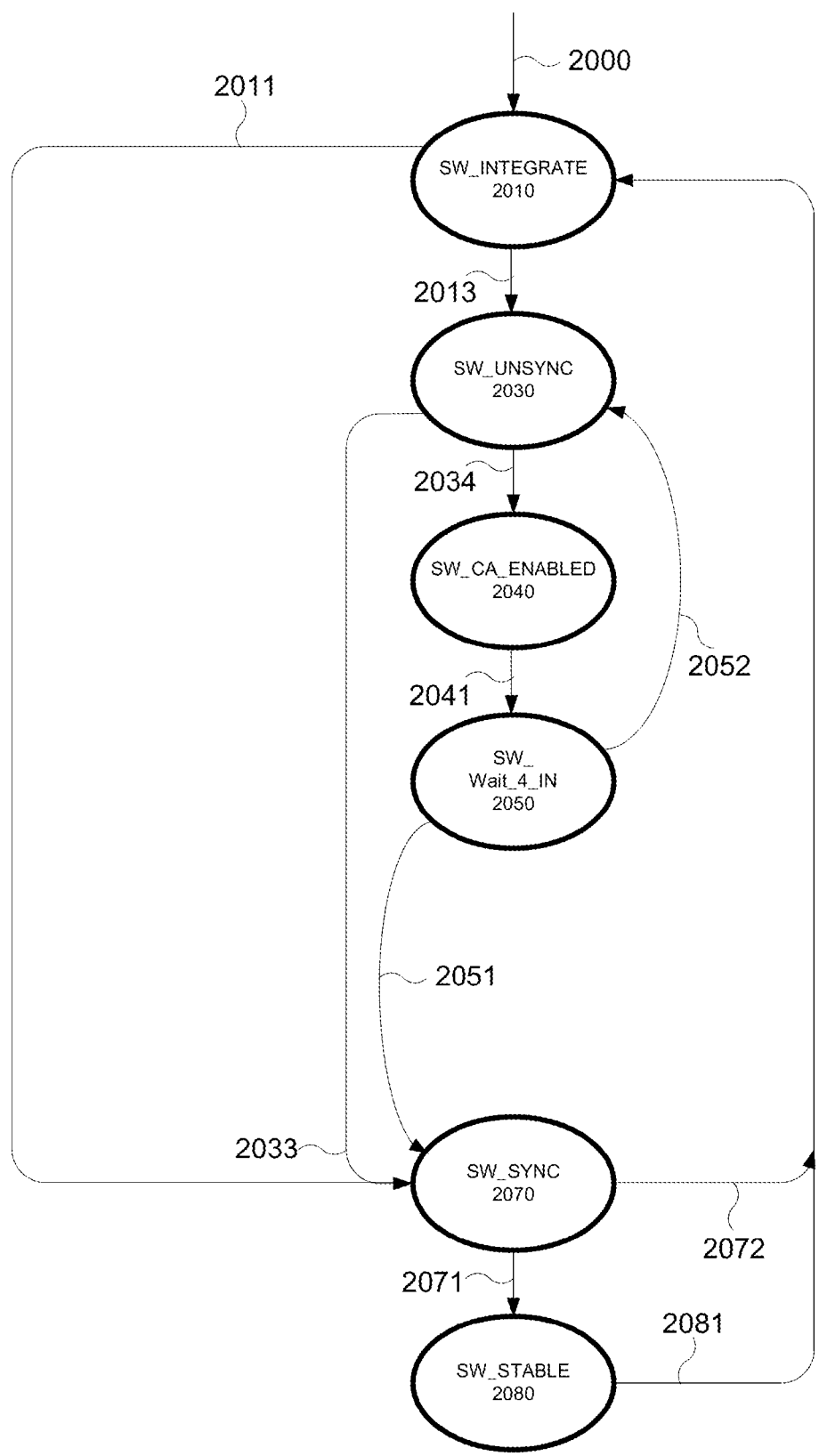
FIG. 9 depicts the protocol state machine executed in a switch if the end systems are assumed not to be trusted, and the switch is executing an extensive guardian function.

FIG. 9 depicts the protocol state machine executed in a switch, if the end systems are assumed not to be trusted. The switch state machine, again, is very similar to the end system state machine. In one realization the state machines of end system and switch are unified, such that the behavior of end system and switch can be selected via configuration.

A switch that operates with end systems that are not trusted relays coldstart frames when the switch is in SW_UNSYNC state 2030 and blocks coldstart frames in all other states.

A switch that operates with end systems that are not trusted relays coldstart acknowledge frames when the switch is in SW_UNSYNC state 2030 provided that the value of the Membership New field 402 is sufficiently high or when the switch is in SW_CA_ENABLED state 2040 and blocks coldstart acknowledge frames in all other states.

A switch that operates with end systems that are not trusted relays integration frames in SW_INTEGRATE state 2010, SW_UNSYNC state 2030, SW_WAIT_4_IN state 2040, SW_SYNC state 2070, and in SW_STABLE state 2080, if the switch has a transition defined in its protocol state machine that uses the integration frame or the integration frame is used for the clock synchronization process. All other integration frames are blocked. The switch will block integration frames that are not used in the switch protocol state machine. For example such an integration frame may be a faulty integration frame sent by a single faulty end system.

SW_INTEGRATE State 2010

Upon power-on the switch state machine starts in SW_INTEGRATE state 2010. From SW_INTEGRATE state 2010 the switch can enter a synchronized state SW_SYNC state 2070 when it receives an integration frame with a sufficiently high number of bits set in the Membership new field 402 (Transition 2011).

When the switch does not receive integration frames with a sufficient number of bits set for either transition 2011 or 2012 for a configurable duration, the switch enters SW_UNSYNC state 2030 (Transition 2013).

SW_UNSYNC State 2030

From SW_UNSYNC state, the switch is allowed to enter SW_SYNC state 2070 provided that it receives an integration frame with a sufficient number of bits set for the transition 2033 (integration process).

When the switch receives a coldstart frame or a sufficient number of coldstart acknowledge frames it transits to SW_CA_ENABLED state 2040 (Transition 2034).

SW_CA_ENABLED State 2040

The switch transits to SW_WAIT_4_IN state 2050 after a configurable timeout expired (Transition 2041).

SW_WAIT_4_IN State 2050

In the SW_WAIT_4_IN State 2050 the switch waits to receive an integration frame with sufficiently high number of bits set in the Membership New field 402 it transits to SW_SYNC state 2070 (Transition 2051). If the switch does not receive such an integration frame for a configurable timeout, the switch transits back to SW_UNSYNC state 2030 (Transition 2052).

SW_SYNC State 2070

When the asynchronous clique detection algorithm is enabled and returns successful, the switch transits to SW_INTEGRATE state 2010 (Transition 2072). When the synchronous clique detection algorithm is enabled and returns successful, the switch transits to SW_INTEGRATE state 2010 (Transition 2072).

When the switch stays in the SW_SYNC state 2070 for a configurable number of integration cycles INC, the switch may transit to SW_STABLE state 2080, if a configurable flag is set (Transition 2071).

SW_STABLE State 2080

When the asynchronous clique detection algorithm is enabled and returns successful, the switch transits to SW_INTEGRATE state 2010 (Transition 2081). Also, when the synchronous clique detection algorithm is enabled and returns successful for a configurable number or sequential integration cycles INC, then the switch transits to SW_INTEGRATE state 2010 (Transition 2081) as well.

FIG. 10 depicts a fault-free and collision-free startup scenario of the distributed computer network, progress in real-time is depicted from left to right. The message flow on only one communication channel, channel including switch 201, is depicted.

The invention distinguishes different types of messages: coldstart frames 3101, coldstart acknowledge frames 4102-4105 and integration frames 5101-5105. Integration frames are used during synchronized operation, that is, once synchronization has been established successfully. Coldstart frames are used to start the Fault-Tolerant Handshake phase. Coldstart acknowledgment frames are used to confirm and end the Fault-Tolerant Handshake process and are used for synchronization when received outside a Fault-Tolerant Handshake phase. FIG. 10 depicts the Fault-Tolerant Handshake FTH starting with the acceptance of the coldstart frame 3101 and ending with the reception of the coldstart acknowledgment frame 4201.

Each end system 101-105 will send a coldstart acknowledgment frame to a coldstart frame that it accepts. An end system will accept all coldstart frames sent from other end systems (an end system can be configured to react or not to react to own coldstart frames) that are received during the FTH and the CSO will be restarted. When the coldstart offset CSO times out an end system will send a coldstart acknowledge frame. When the end system receives a coldstart acknowledge frame back from the switch it concludes that the Fault-Tolerant Handshake FTH has been successful and proceeds towards a synchronized state. Only this responding coldstart acknowledge frames are used during the FTH. Coldstart acknowledge frames that are received too early during the FTH are discarded. When the end system does not receive a coldstart acknowledgment frame back to its own sent coldstart acknowledgment frame it concludes that the Fault-Tolerant Handshake FTH has not been successful and enters an unsynchronized state.

The scenario in FIG. 10 starts with end system 101 sending a coldstart frame 3101. In one realization the coldstart frame is relayed by the switch 201 back to all end systems 101-105. Upon relay the switch sets the bit in the Membership new field 402 that is associated with the respective sender of the coldstart frame, in this scenario end system 101 and clears all other bits. This means that each receiving end system can identify the sender of a coldstart frame via the Membership new field 402. In this scenario each end system identifies end system 101 as the original sender of the coldstart frame 3101.

In one realization all end systems 101-105 are configured such that they will not react to own coldstart frames (which are coldstart frames originally sent by the respective end system). End systems 102-105 will start a coldstart offset timeout CSO. When the timeout expires end systems 102-105 will send a coldstart acknowledge frame 4102-4105.

In one realization the switches compress the coldstart acknowledge frame 4102-4105 and generate a new coldstart acknowledge frame 4201. The compressed coldstart acknowledge frame 4201 is then sent to the end systems. End systems 101-105 will start a coldstart acknowledgment timeout CAO upon reception of a coldstart acknowledge frame 4201. When the timeout expires, end systems 101-105 will enter a synchronized state and send an integration frame 5101-5105. In another realization the coldstart acknowledge frames are not compressed, but all coldstart acknowledge frames are forwarded by the switches 201-202.

FIG. 11 depicts a fault-free collision startup scenario, progress in real-time is depicted from left to right. For fault-tolerance reasons a magnitude of end system 101-105 is configured to provide synchronization messages, such that in the case of the failure of a subset of the end system, synchronization messages will be still generated by those end systems that are not faulty. In particular, a magnitude of end systems 101-105 can be configured to provide coldstart messages, which are used for initial synchronization. As these messages are the very first synchronization messages to be sent when no synchronization message is yet established, two or more end systems may decide to send their coldstart frame at approximately the same point in time, during an interval that we call the collision domain CD. In principle it is possible to use a collision as such as the initial synchronization event. However, in this case the initial synchronization is a direct function of the collision domain CD, as two different end systems 101-105 may decide to use different coldstart frames for synchronization. In store and forward networks the collision domain CD is of a significant size. Hence, to improve the initial synchronization, the invention specifies a mechanism to deterministically resolve collision scenarios. The scenario depicted in FIG. 11 depicts an example scenario on how collisions are resolved in the fault-free case.

The scenario starts with end system 102 sending a coldstart frame 3102. Within the collision duration CD after the start of transmission of coldstart frame 3102 end system 101 starts to send a coldstart frame 3101 as well, resulting in a collision. The coldstart frame 3102 is the first one to be relayed by the switches 201-202 and received by the end systems 101-105. End systems 101, 103-105 will use this coldstart frame 3102 to start the coldstart offset timeout CSO (end system 102 is configured not to use its own coldstart frame). However, after the reception of coldstart frame 3102 coldstart frame 3101 is relayed by the switches 201-202 to the end systems 101-105. End systems 102-105 will use coldstart frame 3102 to reset the coldstart offset timeout CSO. End system 101 will not react to the coldstart frame 3101, because it is also configured not to react to own coldstart frames. Consequently, end system 101 is the first one to time out and send a coldstart acknowledge frame 4101. Following, end systems 102-105 send their coldstart acknowledge frames 4102-4105, as their coldstart offset timeout CSO occurs later. The switches process the coldstart acknowledge frame 4101 from end system 101 first and send a resulting coldstart acknowledge frame 4201 back to the end systems 101-105. Only end system 101 will react to this coldstart acknowledge frame by starting the coldstart acknowledge offset timeout CAO. End systems 102-105 will not use the coldstart acknowledge frame 4201 as it is received too early in their Fault-Tolerant Handshake FTH. Once end systems 101-105 receive the coldstart acknowledge frame 4211, all end systems 101-105 will accept this coldstart acknowledge: end systems 102-105 because it temporally fits into their Fault-Tolerant Handshake FTH phase and end system 102 because it already ended its FTH.

Figure 12:
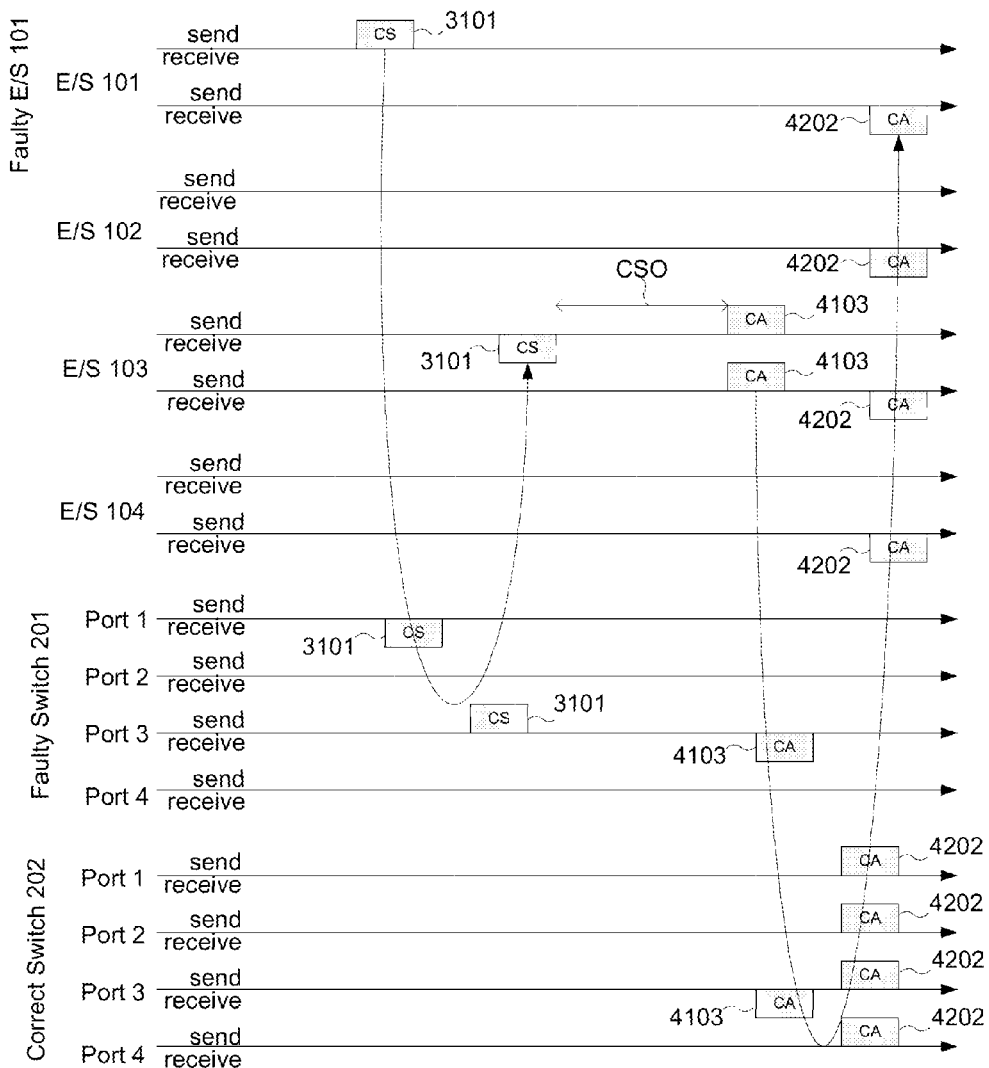
FIG. 12 depicts a startup scenario in presence of a faulty end system 101 and a faulty switch 201 of the distributed computer network.

FIG. 12 depicts a failure scenario during startup comprising a faulty end system 101 and a faulty switch 201, progress in real-time is depicted from left to right. The scenario starts with the faulty end system 101 sending a coldstart frame 3101 only to switch 201 (a correct end system will always send a synchronization frame on all replicated channels). The faulty switch 201 relays the coldstart frame 3101 only to end system 103 (a correct switch will always send a synchronization to all end systems). End system 103 receives the coldstart frame 3101 and starts its Fault-Tolerant Handshake by setting the coldstart offset timeout CSO. When CTO expires, end system 103 sends a coldstart acknowledge frame on all replicated channels. Hence, the faulty switch 201 and the correct switch 202 receive the coldstart acknowledge frame 4103. The correct switch 202 will relay the coldstart acknowledge frame 4103 as coldstart acknowledge frame 4202 to all end systems 101-104. End system 103 will receive this coldstart acknowledge frame 4202 matching its Fault-Tolerant Handshake FTH and conclude that the FTH was successful. End systems 102, and 104 receive the coldstart acknowledge frame outside an FTH and, hence, use it for synchronization. Hence, all correct end systems will start the coldstart acknowledge offset CAO with the reception of the coldstart acknowledgment frame 4202 and will proceed to a synchronized operation.

The invention claimed is:

1. A method for synchronizing local clocks in a distributed computer network, where said computer network consists of a number of end systems and at least two switches, where each end system is connected to at least two switches via bi-directional communication links, and where a configured subset of end systems and switches executes the method in form of a synchronization state machine,
characterized in that
   a) the state machine uses at least three different frame types: coldstart frame type, coldstart acknowledge frame type, and integration frame type;
   b) the states in the state machine are either said to belong to an unsynchronized set of states or belong to a synchronized set of states;
   c) all end systems that are configured as Synchronization Master periodically send coldstart frames in one of the unsynchronized states;
   d) all end systems that are configured as Synchronization Master react to the reception of a coldstart frame by sending a coldstart acknowledgment frame a configurable first timeout after the reception of the coldstart frame on all replicated communication channels, provided that the end system is in a state in which the synchronization state machine defines a transition for coldstart frames, and where said first timeout is reset when a consecutive coldstart frame is received before the coldstart acknowledge is sent; and
   e) all end systems that are configured as Synchronization Master react to the reception of a coldstart acknowledgment frame by starting a configurable second timeout, provided that they are not already executing said first timeout, and entering a synchronized state when said second timeout expires.

2. The method according to claim 1, characterized in that an end system will not react to own coldstart frames.

3. The method according to claim 1, characterized in that the end systems configured as Synchronization Masters that are in one of the synchronized states periodically send integration frames, which integration frames are used for clock synchronization by those end systems that are already in a synchronized state and are used for integration by those end systems that are in one of the unsynchronized states.

4. The method according to claim 1, characterized in that the message sender is identified by a bit set in the synchronization message.

5. The method according to claim 1, characterized in that the end systems and/or switches execute a synchronous clique detection algorithm in at least one of the synchronized states.

6. The method according to claim 5, characterized in that the synchronous clique detection algorithm is realized in a way that a component (end system or switch) monitors the end systems that are synchronized with said component and if the number of end systems that are synchronized with said component falls below a threshold for a number of communication cycles, the component enters an unsynchronized states.

7. The method according to claim 6, characterized in that the threshold used in the synchronous clique detection algorithm can be individually set per synchronized state.

8. The method according to claim 1, characterized in that the end systems and/or switches execute an asynchronous clique detection algorithm in at least one of the synchronized states.

9. The method according to claim 8, characterized in that the asynchronous clique detection algorithm is realized such that a component (end system or switch) monitors the end systems that are not synchronized with said component but operational and if the number of end systems that are not synchronized with said component grows beyond a state-specific threshold for a number of communication cycles, the component enters an unsynchronized states.

10. The method according to claim 9, characterized in that the threshold used in the asynchronous clique detection algorithm can be individually set per synchronized state.

11. The method according to claim 1, characterized in that an end system realizes the method to count unsynchronized components by recording bits set in the synchronization message in out-of-schedule received integration frames set, for a duration that is longer than one integration cycle INC and the number end systems that are unsynchronized with said component is the bitsum of the bits set in the recorded data structure.

12. The method according to claim 1, characterized in that one of the synchronized states is entered from another synchronous state when said component was a configurable time in Sync State.

13. The method according to claim 1, characterized in that an end system or a switch transits from one of the synchronized states to one of the unsynchronized states when the synchronous clique detection mechanism indicates that the number of synchronized end systems is lower than a state-specific configured threshold for a configurable number of integration cycles in sequence and not upon the first indication.

14. The method according to claim 1, characterized in that the switch is configurable per state to relay messages with a configurable set of types only.

15. An end system to be used in a method according to claim 1.

16. A switch to be used in a method according to claim 1.

17. A network consisting of a number of end systems according to claim 15, wherein each of the end systems is connected to at least two switches via bi-directional communication links.

* * * * *